US006473464B1

(12) United States Patent
Weitbruch et al.
(10) Patent No.: US 6,473,464 B1
(45) Date of Patent: Oct. 29, 2002

(54) METHOD AND APPARATUS FOR PROCESSING VIDEO PICTURES, ESPECIALLY FOR FALSE CONTOUR EFFECT COMPENSATION

(75) Inventors: Sébastien Weitbruch, Mönchweiler; Gangolf Hirtz, Kronach; Carlos Correa, Villingen-Schwenningen, all of (DE)

(73) Assignee: Thomson Licensing, S.A., Boulogne (FR)

(*) Notice: Subject to any disclaimer, the term of this patent is extended or adjusted under 35 U.S.C. 154(b) by 0 days.

(21) Appl. No.: 09/354,388

(22) Filed: Jul. 15, 1999

(30) Foreign Application Priority Data

Aug. 7, 1998 (EP) .......................................... 98114883

(51) Int. Cl.[7] ................................................ H04N 7/12

(52) U.S. Cl. .................................... 375/240.26; 348/29

(58) Field of Search ....................... 375/240.26, 240.27, 375/240.29; 348/25–26, 29, 575, 607, 612, 617, 621, 624; 382/162, 166–167; 345/474, 60, 63, 147

(56) References Cited

U.S. PATENT DOCUMENTS 5,068,723 A * 11/1991 Dixit et al. .............. 348/420.1
5,724,054 A * 3/1998 Shinoda ....................... 345/60
5,907,316 A * 5/1999 Mikoshiba et al. ......... 345/147
6,091,396 A * 7/2000 Minami et al. ............. 345/690
6,198,773 B1 * 3/2001 Gill et al. .................... 348/716
6,333,766 B1 * 12/2001 Kougami et al. ........... 345/690

FOREIGN PATENT DOCUMENTS

EP 0444962 9/1991 ............ G09G/3/28
EP 0822536 2/1998 ............ G09G/3/28

OTHER PUBLICATIONS

Search Report for European Patent Appln. No. 98114883.6.
Patent Abstracts of Japan, vol. 097, No. 009, Sep. 30, 1997 & JP 09 138666 A.
Patent Abstracts of Japan, vol. 096, No. 009, Sep. 30, 1996 & JP 08123355 A.

* cited by examiner

*Primary Examiner*—Vu Le
(74) *Attorney, Agent, or Firm*—Joseph S. Tripoli; Joseph J. Laks; Sammy S. Henig

(57) ABSTRACT

With the new plasma display panel technology new kinds of artefacts can occur in video pictures. These artefacts are commonly described as "dynamic false contour effect", since they correspond to disturbances of gray levels and colors in the form of an apparition of colored edges in the picture when the observation point on the PDP screen moves. According to the invention, such an artefact is compensated by analyzing the motion in the pictures, assigning to each block of a picture a corresponding motion vector and performing a re-coding step in which the different sub-fields of a pixel are shifted to distribute the sub-fields of a pixel more closely on the eye trajectory.

9 Claims, 8 Drawing Sheets

METHOD AND APPARATUS FOR PROCESSING VIDEO PICTURES, ESPECIALLY FOR FALSE CONTOUR EFFECT COMPENSATION

BACKGROUND OF THE INVENTION

The invention relates to a method and apparatus for processing video pictures, especially for false contour effect compensation.

More specifically the invention is closely related to a kind of video processing for improving the picture quality of pictures which are displayed on matrix displays like plasma display panels (PDP) or display devices with digital micro mirror arrays (DMD).

Although plasma display panels are known for many years, plasma displays are encountering a growing interest from TV manufacturers. Indeed, this technology now makes it possible to achieve flat color panels of large size and with limited depths without any viewing angle constraints. The size of the displays may be much larger than the classical CRT picture tubes would have ever been allowed.

Referring to the latest generation of European TV sets, a lot of work has been made to improve its picture quality. Consequently, there is a strong demand, that a TV set built in a new technology like the plasma display technology has to provide a picture so good or better than the old standard TV technology. On one hand, the plasma display technology gives the possibility of nearly unlimited screen size, also of attractive thickness, but on the other hand, it generates new kinds of artefacts which could damage the picture quality. Most of these artefacts are different from the known artefacts occurring on classical CRT color picture tubes. Already due to this different appearance of the artefacts makes them more visible to the viewer since the viewer is used to see the well-known old TV artefacts.

The invention deals with a specific new artefact, which is called "dynamic false contour effect" since it corresponds to disturbances of gray levels and colors in the form of an apparition of colored edges in the picture when an observation point on the matrix screen moves. This kind of artefact is enhanced when the image has a smooth gradation like when the skin of a person is being displayed (e. g. displaying of a face or an arm,etc.). In addition, the same problem occurs on static images when observers are shaking their heads and that leads to the conclusion that such a failure depends on the human visual perception and happens on the retina of the eye.

Two approaches have been discussed to compensate for the false contour effect. As the false contour effect is directly related to the sub-field organization of the used plasma technology one approach is to make an optimization of the sub-field organization of the plasma display panels. The sub-field organization will be explained in greater detail below but for the moment it should be noted that it is a kind of decomposition of the 8-bit gray level in 8 or more lighting sub-periods. An optimization of such a picture have, indeed, a positive effect on the false contour effect. Nevertheless, such a solution can only slightly reduce the false contour effect amplitude but in any cases the effect will still occur and will be perceivable. Furthermore, sub-field organization is not a simple matter of design choice. The more sub-fields are allowed the more complicated will the plasma display panel be. So, optimization of the sub-field organization is only possible in a narrow range and will not eliminate this effect alone.

The second approach for the solution of above-mentioned problem is known under the expression "pulse equalization technique". This technique is a more complex one. It utilizes equalizing pulses which are added or separated from the TV signal when disturbances of gray scales are foreseen. In addition, since the fact that the false contour effect is motion relevant, we need different pulses for each possible speed. That leads to the need of a big memory storing a number of big look-up tables (LUT) for each speed and there is a need of a motion estimator. Furthermore, since the false contour effect depends on the sub-field organization, the pulses have to be re-calculated for each new sub-field organization. However the big disadvantage of this technique results from the fact that the equalizing pulses add failures to the picture to compensate for a failure appearing on the eye retina. Additionally, when the motion is increasing in the picture, there is a need to add more pulses to the picture and that leads to conflicts with the picture contents in case of very fast motion.

SUMMARY OF THE INVENTION

Therefore, it is an object of the present invention to disclose a method and an apparatus which achieves an efficient false contour effect compensation without affecting the picture content and which is easy to implement.

It is embodied in the present invention an apparatus and method for the compensation of the false contour effect by utilizing a motion estimator which determines motion vectors for blocks of pixel data. The resulting motion vectors are utilized for re-coding the pixels of the block wherein in the re-coding step a step of shifting the sub-fields of pixels is included. The so calculated pixels of the block are used to display the picture instead of displaying the original pixel data. Thus, the general idea of the invention is to detect the movements in the picture (displacement of the eye focus area) and to spread the right sub-field pulses over this displacement in order to be sure that the eye will only perceive the correct information through its movement.

This solution based on a motion estimator has the big advantage that it will not add false information in the picture and, in addition, this solution is independent from the picture contents and also from the sub-field organization. Further advantages are, that the inventive method allows a complete correction of the false contour effect when the motion vector is well-known. Also the method is not dependent from the used addressing technique for the plasma display panel. With regard to the disclosed specific embodiment, when the addressing or the sub-field organization changes, there is only the need to re-calculate the different centers of gravity of the sub-fields but the algorithm remains unchanged.

Another important advantage is that the picture noise has no impact on the correction quality. The method according to the invention is simple to implement. There is no need of a big memory since it does not need any kind of LUTs like the pulse equalization technique.

Advantageously, additional embodiments of the inventive method are disclosed in the respective dependent claims.

BRIEF DESCRIPTION OF THE DRAWING

Exemplary embodiments of the invention are illustrated in the drawings and are explained in more detail in the following description.

In the figures.

DESCRIPTION OF THE PREFFERED EMBODIMENTS

Figure 1:
FIG. 1 shows a video picture in which the false contour effect is simulated.

The artefact due to the false contour effect is shown in FIG. 1. On the arm of the displayed woman are shown two dark lines, which e.g. are caused by this false contour effect. Also in the face of the woman such dark lines occur on the right side.

A plasma display panel utilizes a matrix array of discharge cells which could only be switched ON or OFF. Also unlike a CRT or LCD in which gray levels are expressed by analog control of the light emission, in a PDP the gray level is controlled by modulating the number of light pulses per frame. This time-modulation will be integrated by the eye over a period corresponding to the eye time response. When an observation point (eye focus area) on the PDP screen moves, the eye will follow this movement. Consequently, it will no more integrate the light from the same cell over a frame period (static integration) but it will integrate information coming from different cells located on the movement trajectory. Thus it will mix all the light pulses during this movement which leads to a faulty signal information. This effect will now be explained in more detail below.

In the field of video processing is an 8-bit representation of a luminance level very common. In this case each level will be represented by a combination of the following 8 bits:

$2^0$=1,$2^1$=2, $2^2$=4, $2^3$=8, $2^4$=16, $2^5$=32, $2^6$=64, $2^7$=128

To realize such a coding scheme with the PDP technology, the frame period will be divided in 8 lighting periods which are also very often referred to sub-fields, each one corresponding to one of the 8 bits. The number of light pulses for the bit $2^1$=2 is the double of that for the bit $2^0$=1. With a combination of these 8 sub-periods, we are able to build said 256 different gray levels. Without motion, the eye of the observer will integrate over about a frame period these sub-periods and will have the impression of the right gray level.

Figure 2:
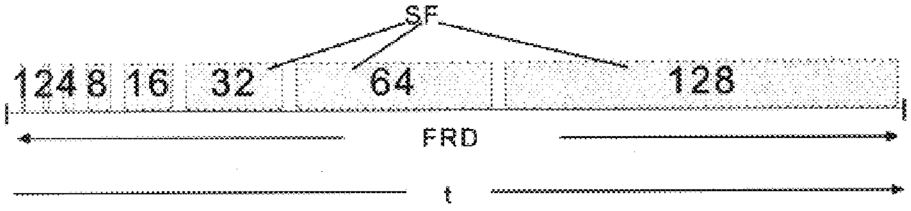
FIG. 2 shows an illustration for explaining the sub-field organization of a PDP.

The above-mentioned sub-field organization is shown in FIG. 2.

The light emission pattern according to the sub-field organization introduces new categories of image quality degradation corresponding to disturbances of gray levels and colors. As already explained, these disturbances are defined as so-called dynamic false contour effect since the fact that it corresponds to the appearance of colored edges in the picture when an observation point on the PDP screen moves. The observer has the impression of a strong contour appearing on a homogeneous area like displayed skin. The degradation is enhanced when the image has a smooth gradation and also when the light emission period exceeds several milliseconds. So, in dark scenes the effect is not so disturbing as in scenes with average gray level (e.g. luminance values from 32 to 223).

In addition, the same problem occurs in static images when observers are shaking the heads which leads to the conclusion that such a failure depends on the human visual perception.

Figure 4:
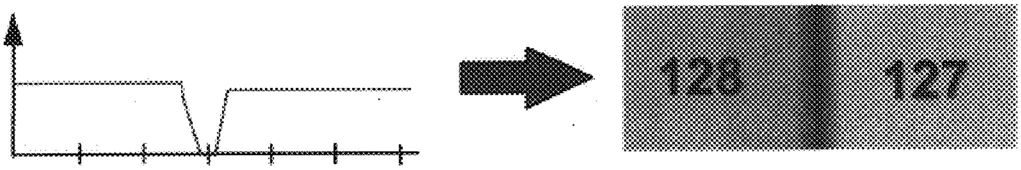
FIG. 4 illustrates the appearance of a dark edge when a display of two frames is being made in the manner shown in FIG. 3.
Figure 3:
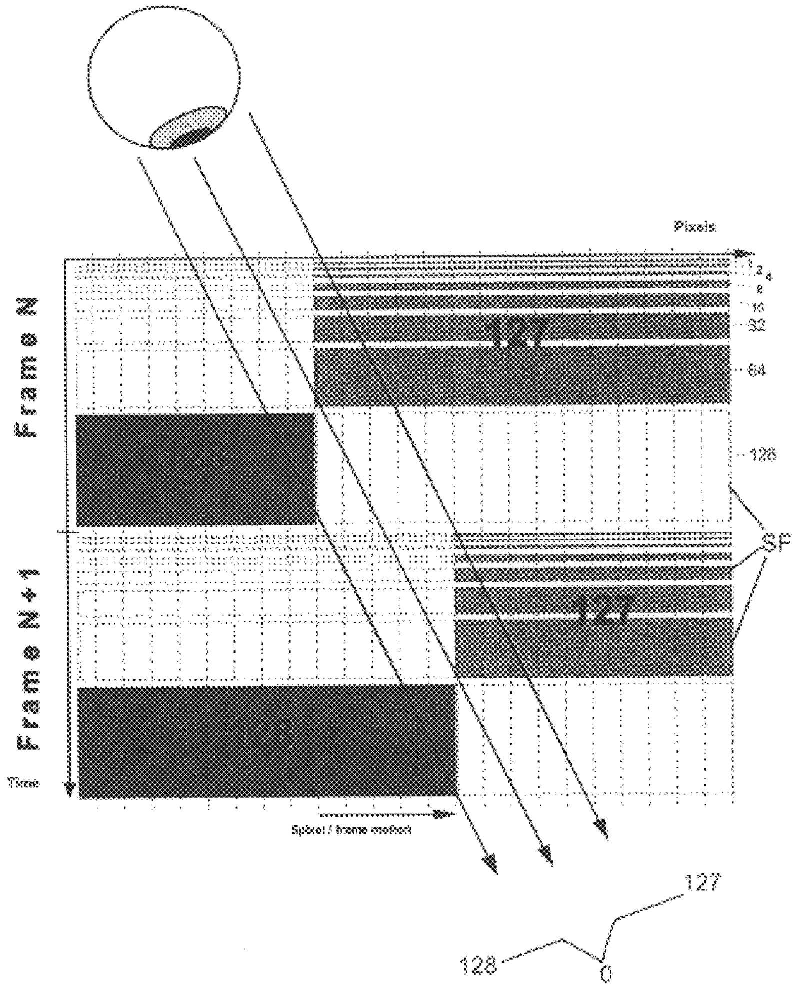
FIG. 3 shows an illustration for explaining the false contour effect.

To better understand the basic mechanism of visual perception of moving images, a simple case will be considered. Let us assume a transition between the luminance levels 128 and 127 moving at a speed of 5 pixel per video frame and the eye is following this movement. FIG. 3 shows a darker shaded area corresponding to the luminance level 128 and a lighter shaded area corresponding to the luminance area level 127. The sub-field organization, shown in FIG. 2 is used for building the luminance levels 128 and 127 as it is depicted on the right side of FIG. 3. The three parallel lines in FIG. 3 indicate the direction in which the eye is following the movement. The two outer lines show the area borders where a faulty signal will be perceived. Between them the eye will perceive a lack of luminance which leads to the appearance of a dark edge in the corresponding area which is illustrated in FIG. 4. The effect that a lack of luminance will be perceived in the shown area is due to the fact that the eye will no more integrate all lighting periods of one pixel when the point from which the eye receives light is in movement. Only part of the light pulses will probably be integrated when the point moves. Therefore, there is a lack of corresponding luminance and the dark edge will occur. On the left side of FIG. 4, there is shown a curve which illustrates the behavior of the eye cells during observing the moving picture depicted in FIG. 3. The eye cells having a good distance from the horizontal transition will integrate enough light from the corresponding pixels. Only the eye cells which are near the transition will not be able to integrate a lot of light from the same pixels.

Figure 5:
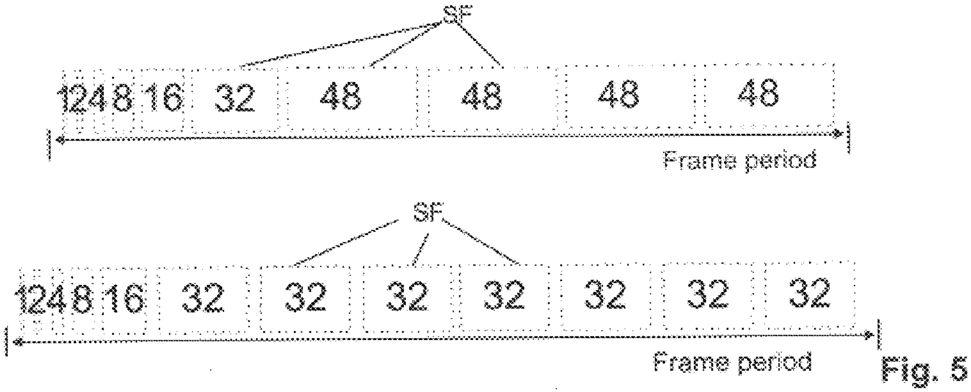
FIG. 5 shows two different sub-field organization schemes.

To improve this behavior at first, a new sub-field organization is presented which has more sub-fields and above all has more. sub-fields with the same weight. This will already reduce the contouring effect and improve the situation. Furthermore, it allows for the inventive correction method which will be explained afterwards. In FIG. 5 two examples of new coding schemes are shown. The choice of the optimal one has to be made depending on the plasma technology. In the first example there are ten sub-fields used wherein there are four sub-fields having lighting periods with a relative duration of 48/256. In the second example there are twelve sub-fields and there are seven sub-fields having the relative duration of 32/256. Please note that the frame period has a relative duration of 256/256.

Figure 6:
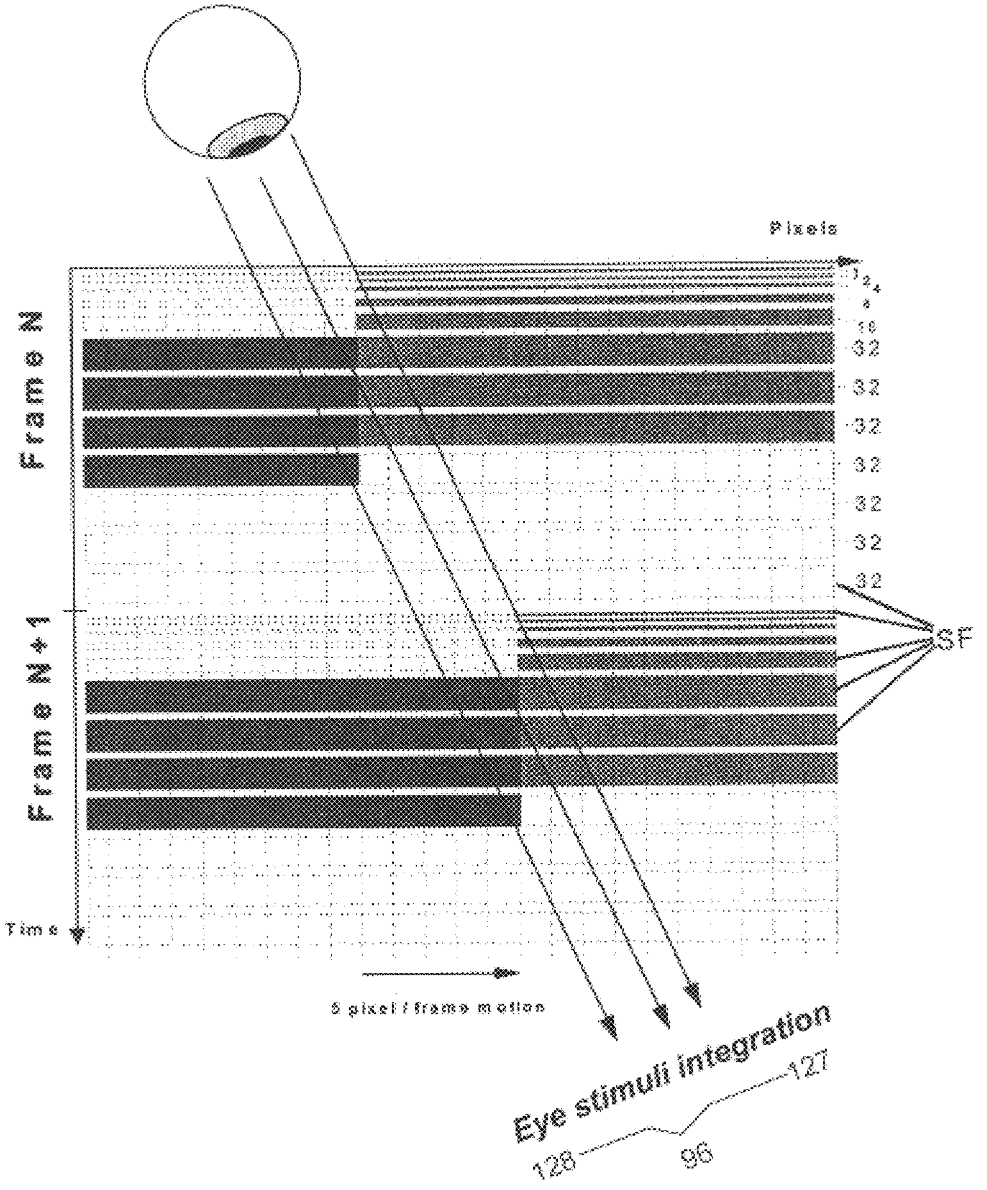
FIG. 6 shows the illustration of FIG. 3 but with sub-field organization according to FIG. 5.

In FIG. 6 the result of the new sub-field organization according to the second example of FIG. 5 is shown in case of the 128/127 horizontal transition moving at a speed of five pixels per frame. Now, the chance that the corresponding eye cells will integrate more similar amounts of lighting periods is increased. This is illustrated by the eye-stimuli integration curve at the bottom of FIG. 6 when compared to the eye-stimuli integration curve at the bottom of FIG. 3.

Figure 7:
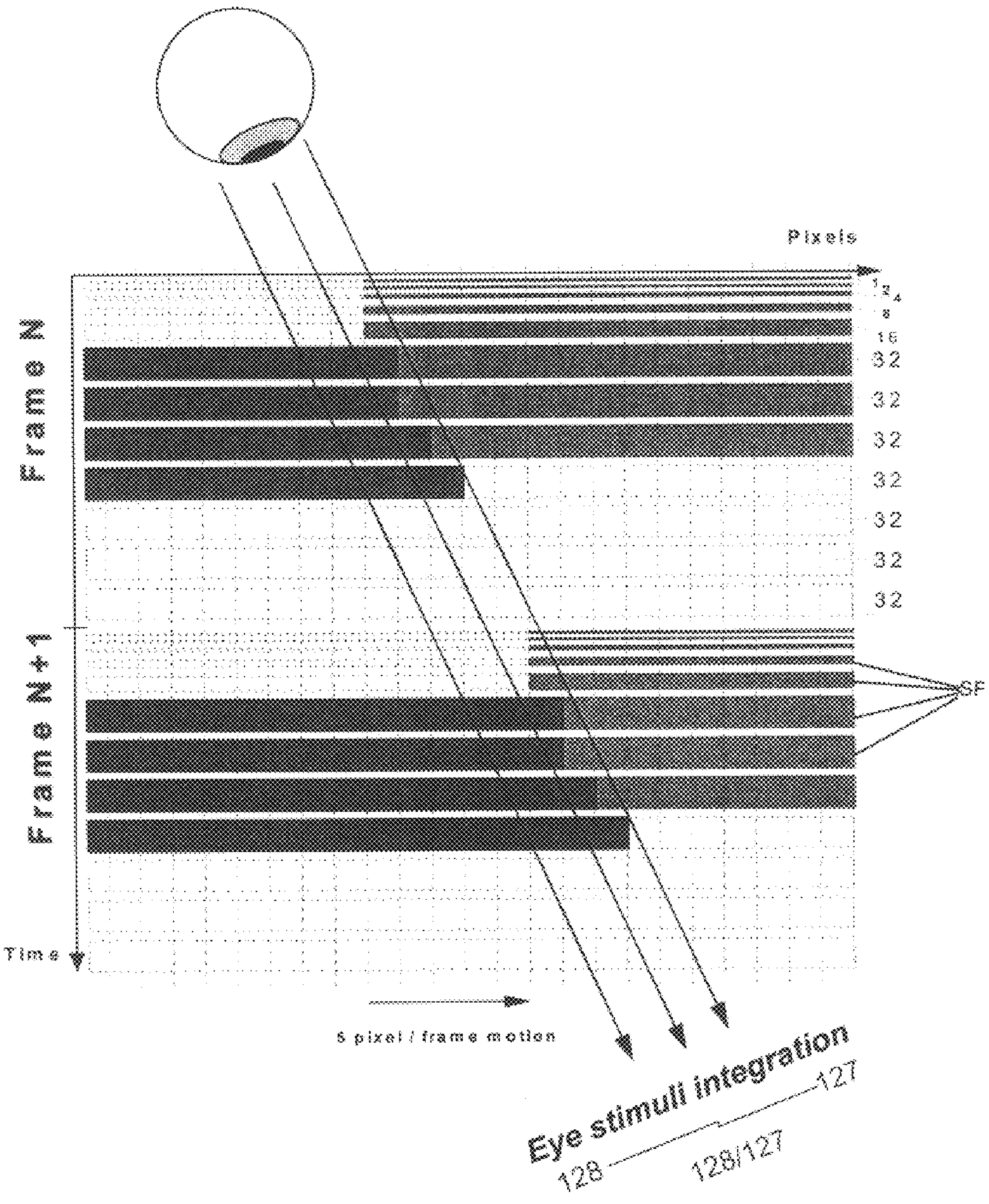
FIG. 7 shows an illustration for the sub-field shift operation according to the invention.

Now the main idea of the invention is to anticipate the movement in the picture in order to position the different bit planes of the moving area on the eye integration trajectory. According to this the different bit planes of a pixel are shifted depending on the eye movement to make sure that the eye will receive the right information at the right time during its movement. This principle is illustrated in FIG. 7. There it is shown that in the area around the horizontal transition the sixth and seventh bit plane is shifted by one pixel to the right, the eighth bit plane is shifted by two pixels to the right and the ninth bit plane is shifted by three pixels to the right. The effect of this is, that the eye will integrate all the lighting periods of the sixth to ninth bit plane, thus leading to a corresponding luminance value of 128 as shown in the eye-stimuli curve at the bottom of FIG. 7. The result is that no dark area will be perceived.

Please note that the illustration is simplified in that respect that the stimuli integration curve is smoothed at the border areas of the transition. As a result, this technique aims to modify the coding of the pixels depending on the motion amplitude and direction. This technique shows very good result since it makes it possible to remove completely the false contour effect when the motion is well detected. In the case of a false motion estimation, since no pulses are added to the picture but picture contents are shifted, the picture quality is not disturbed a lot.

Figure 8:
FIG. 8 shows the video picture of FIG. 1 with a subdivision in blocks of pixels.

In the following, the algorithm is described in greater detail. At first, the original picture is segmented in blocks, each of which will have a single motion vector assigned. An example of such a decomposition is shown in FIG. 8. Other types of motion-dependent pictures segmentations could be used, since the goal is only to decompose the picture in basic elements having a well-defined motion vector. So all motion estimators can be used for the invention, which are able to subdivide a picture in blocks and to calculate for each block a corresponding motion vector. As motion estimators are well-known from, for example 100 Hz up-conversion technique and also from MPEG coding etc., they are well-known in the art and there is no need to describe them in greater detail here. As an example where a motion estimator is described which could be used in this invention, it is referred to WO-A-89/08891. Best to be used are motion estimators which give precisely the direction of the movement and the amplitude of this movement for each block. Since most of the plasma display panels are working on RGB component data, benefit could be achieved when for each RGB component a separate motion estimation is being carried out and these three components are combined so that the efficiency of the motion estimation will improved.

The picture block re-coding step will follow the motion estimation step. In the embodiment of the invention described here, there are some simplifying assumptions made:

1.) The addressing time of the PDP is not taken into account.

2.) The twelve sub-fields organization scheme shown in example 2 of FIG. 5 is used.

Figure 9:
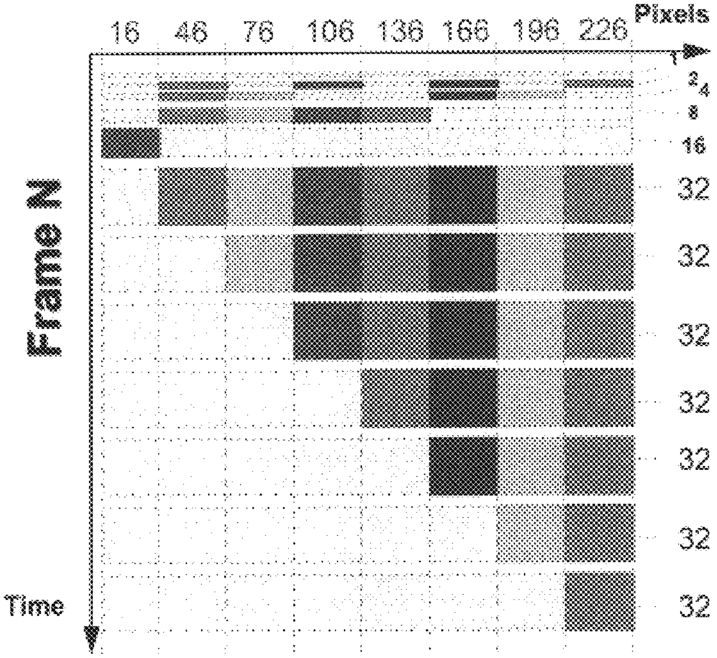
FIG. 9 shows a specific horizontal pattern of a pixel block.
Figure 10:
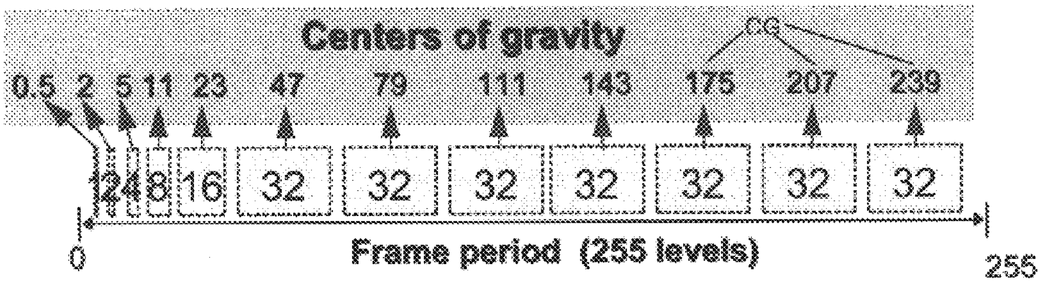
FIG. 10 shows an illustration of the positions of the centers of gravity for the different sub-fields.

To illustrate the operation of the picture block re-coding step a simple pattern block moving horizontally at a speed of 7 pixel per frame is selected as an example. Consider a block 8×8 including a horizontal pattern with the following luminance values: 16–46–76–106–136–166–196–226. The coding according to our selected subfield organization is the one shown in FIG. 9. In a first step a computation of the new sub-field positions is performed. To each sub-field corresponds a center of gravity (at the position of the middle of the sub-field duration) representing its location in the frame period. Note, that the addressing time is not being taken into account here. FIG. 10 illustrates the center of gravity positions within a frame period, wherein a frame lasts from 0 to 255 relative time units. As plasma displays are addressed in progressive scan mode (interlace video norms require a previous conversion, here) a video frame lasts 20 ms for 50 Hz plasma panel technology. For interlace—progressive scan conversion many solutions are known in the art which can be used here.

The computation of the center of gravity for each sub-field can easily be calculated according to the simple formula $$G(n)=S(n)+Dur(n)/2$$

where G(n) represents the center of gravity location of a current sub-field, n represents the current sub-field number, S(n) represents the start point of the current sub-field and Dur(n) represents the duration of the sub-field.

Having given a motion vector V=(Vx; Vy), the new position of the sub-fields will be calculated according to the formula $$\Delta x_n = \frac{Vx \cdot G(n)}{Dur(F)} \text{ and } \Delta y_n = \frac{Vy \cdot G(n)}{Dur(F)}$$

in which Dur(F) represents the complete duration of the frame and $\Delta x_n$ represents the shift of the current sub-field in x direction and $\Delta y_n$ represents the shift of the current sub-field in y-direction. In the example where V=(7; 0) the following results are found:

| Sub-field | 1 | 2 | 3 | 4 | 5 | 6 | 7 | 8 | 9 | 10 | 11 | 12 |
|---|---|---|---|---|---|---|---|---|---|---|---|---|
| $\Delta_x$ | 0 | 0 | 0 | 0 | 1 | 1 | 2 | 3 | 4 | 5 | 6 | 6 |
| $\Delta_y$ | 0 | 0 | 0 | 0 | 0 | 0 | 0 | 0 | 0 | 0 | 0 | 0 |

Please note, that only the integer parts of the results after rounding are relevant, because the minimum sub-field shift is one pixel.

Figure 11:
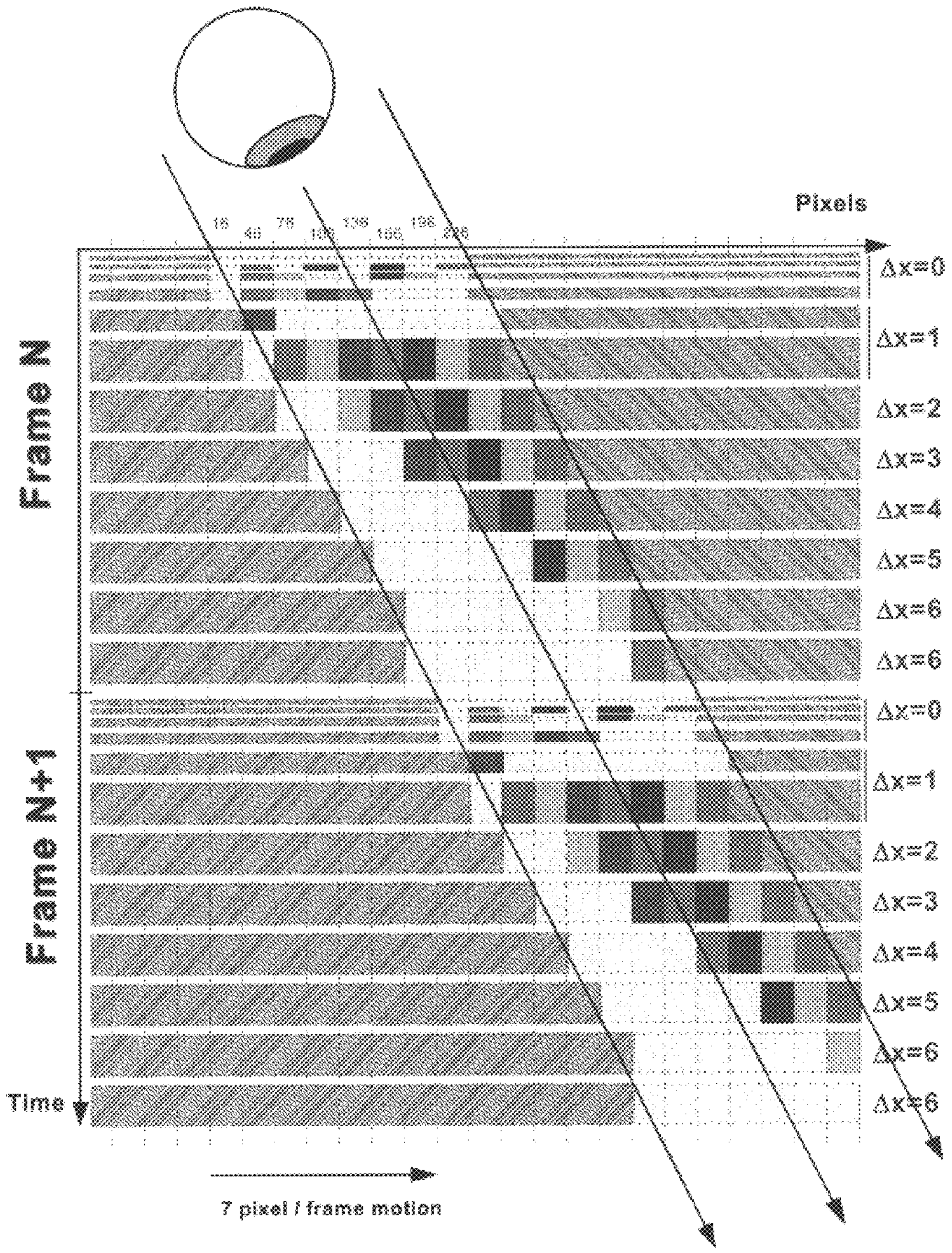
FIG. 11 shows an illustration of the effect of sub-field shifts on the horizontal pattern shown in FIG. 9

Next the step of shifting the different sub-fields of a pixel in the direction of motion will performed. This shifting operation and the end result is shown in FIG. 11. On the right side of FIG. 11 it is depicted by which amount the corresponding sub-fields are to be shifted. For example, the first four sub-fields are not shifted in horizontal direction, the fifth and sixth sub-fields are shifted by one pixel in the horizontal direction and the seventh sub-field is shifted by two pixels in the horizontal direction, etc.

It goes without saying that the same principle will be applied for other speed amplitudes and other directions. In case of a more complex motion direction, bit planes will be moved in both directions horizontal and vertical.

Figure 12:
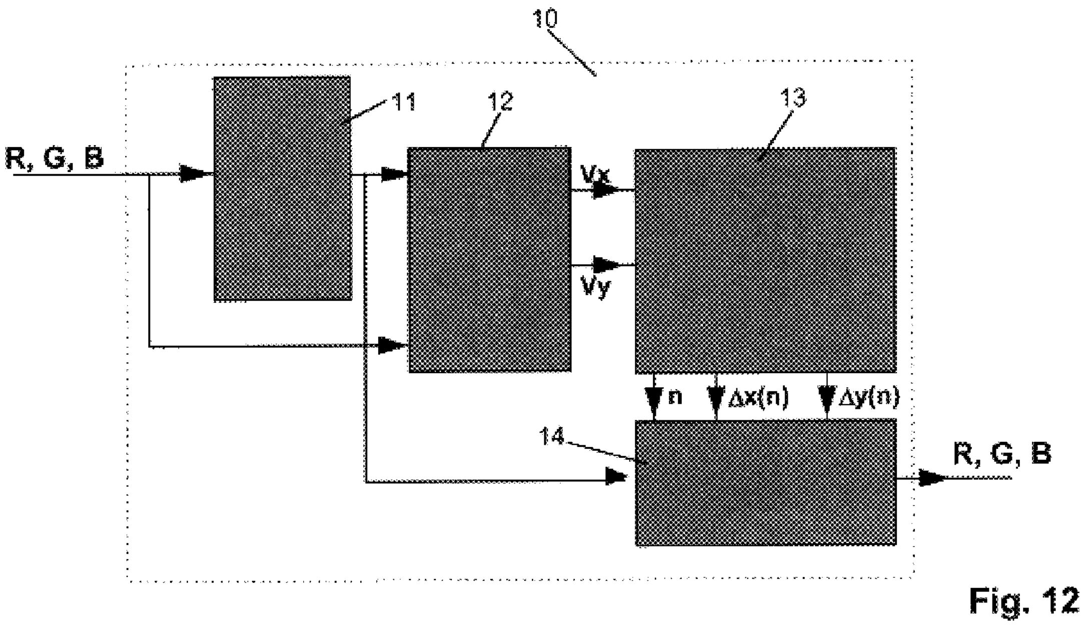
FIG. 12 shows a block diagram of the apparatus according to the invention.

An apparatus according to the invention is shown in FIG. 12. The apparatus may be integrated together with the PDP matrix display. It could also be in a separate box which is to be connected with the plasma display panel. Reference no. 10 denotes the whole apparatus. Reference no. 11 denotes the frame memory to which the RGB data is input. The frame memory 11 is connected to the motion estimator 12. Motion estimator 12 also receives as another input the RGB data of the next frame. So it has access to two succeeding frames in order to detect the motion in the video pictures. The resulting motion vectors are output to the sub-field-shift-computing unit 13.

The resulting sub-field shifts are output to the correction device 14 in which the pixels are re-coded, wherein sub-fields (SF) of pixels are shifted in a direction determined by the motion vector of the block, and corresponding new re-coded RGB data is output.

It goes without saying that the blocks shown in FIG. 12 can be implemented with appropriate computer programs for the same function instead.

The invention is not restricted to the disclosed embodiments. Various modifications are possible and are considered to fall within the scope of the claims. E.g. a different sub-field organization could be used. The values in implementations covered by the patent may differ from those here shown, in particular the number and weight of the used sub-fields.

All kinds of displays which are controlled by using different numbers of pulses for gray-level control can be used in connection with this invention.

What is claimed is:

1. A method for processing video pictures, useful for false contour effect compensation, the video picture comprising pixels, each pixel having assigned an input video value, the method comprising steps of:

converting the input video value of a pixel into a digital code word determining the length of the time period during which the corresponding pixel of a display is activated, wherein to each bit defining a sub-field code word of said digital code word, a certain duration is assigned, defining a sub-field, and wherein the bit entry in the code word determines whether the pixel is activated or deactivated for light output during the assigned sub-field, calculating motion vectors for the pixels of the picture, calculating shift coordinates for the entries in the sub-field code word of a pixel in dependence of the calculated motion vector of the pixel, and processing the sub-field code word of the pixel by redistributing the sub-field code word entries in the original sub-field code word of the pixel in dependence of the calculated shift coordinates of the sub-field code word entries of the pixel.

2. The method according to claim 1, wherein centers of gravity of each sub-field in a frame period are used for the calculation of the sub-field shift coordinates, the centers of gravity being calculated according to the formula:

$$G(n)=S(n)+Dur(n)/2$$

wherein

G(n) represents the center of gravity location in the frame period;

n is the current sub-field number,

S(n) represents the start position of the current sub-field; and

Dur(n) represents the duration of the current sub-field.

3. The method according to claim 2, wherein the calculation of the shift coordinates is made according to the formula:

$$\Delta x_n = \frac{Vx \cdot G(n)}{Dur(F)} \text{ and } \Delta y_n = \frac{Vy \cdot G(n)}{Dur(F)}$$

wherein $\Delta x_n$ represents the shift of a sub-field code word entry of a current sub-field in x-direction;

$\Delta y_n$ represents the shift of a sub-field code word entry of a current sub-field in y-direction;

Vx is the x-component of the motion vector and Vy is the y-component of the motion vector;

G(n) represents the center of gravity position of the sub-field in the frame period;

n is the current sub-field number, and

Dur(F) is the complete duration of the frame.

4. The method according to claim 2, wherein the frame period is sub-divided into 12 sub-fields when the frame period has a relative duration of 256 time units, wherein 7 of said 12 sub-fields have a duration of 32 time units, and wherein each of the remaining 5 sub-fields, respectively, has a different duration.

5. The method according to claim 1, wherein each sub-field corresponds to a specific lighting period of the pixel of the video frame.

6. An apparatus for processing video pictures, useful for false contour effect compensation, the video pictures comprising pixels, the apparatus comprising a coding unit in which input video data of the pixels are digitally coded to generate digital code words, the digital code words determining the length of the time period during which the corresponding pixel of a display is activated, wherein to each bit of a digital code word, defining a sub-field code word, a certain duration is assigned, said assigned duration defining a sub-field, wherein the bit entry in the sub-field code word determines whether the pixel is activated or deactivated for light output during the assigned sub-field, the apparatus comprising a motion estimator for calculating a motion vector for a pixel of a video frame, a calculation unit for calculating shift coordinates for entries in the sub-field code word of the pixel in dependence of the calculated motion vector of the pixel, and a processor for processing the sub-field code words of the pixel by redistributing the sub-field code word entries in the original sub-field code of the pixel in response to the calculated shift coordinates of the sub-field code word entries of the pixel of the block.

7. The apparatus according to claim 6, further comprising a matrix display.

8. The apparatus according to claim 7, wherein the matrix display comprises a plasma display.

9. The apparatus according to claim 7, wherein the matrix display comprises a digital micro mirror display.

* * * * *